United States Patent [19]

Kiuchi et al.

[11] 4,331,406

[45] May 25, 1982

[54] INDICATING DEVICE FOR COMPUTER TYPE ELECTRONIC FLASH UNIT

[75] Inventors: Masayoshi Kiuchi, Yokohama; Masaharu Kawamura, Kawasaki; Masanori Yamada, Yokosuka; Hiroyasu Murakami, Tokyo, all of Japan

[73] Assignee: Canon Kabushiki Kaisha, Tokyo, Japan

[21] Appl. No.: 157,308

[22] Filed: Jun. 9, 1980

[30] Foreign Application Priority Data

May 15, 1979 [JP] Japan .................................. 54-75201

[51] Int. Cl.$^3$ ........................ G03B 15/05; G03B 17/18

[52] U.S. Cl. ..................................... 354/128; 354/145

[58] Field of Search ................ 354/127, 128, 145, 289

[56] References Cited

U.S. PATENT DOCUMENTS 3,979,639 9/1976 Adams, Jr. ...................... 354/128 X 3,999,193 12/1976 Hasegawa ....................... 354/128 X 4,125,766 11/1978 Holtje ............................. 354/128 X

*Primary Examiner*—Michael L. Gellner

*Attorney, Agent, or Firm*—Toren, McGeady and Stanger

[57] ABSTRACT

A flash system including a computer type electronic flash unit and a camera. The computer type electronic flash unit includes an output terminal at which a signal representing the fully charged condition of an electrical energy storage capacitor is produced, a firing stop signal generating circuit and a signal supply circuit for supplying the output of the generating circuit to the output terminal. The camera includes an indicating device connected to the output terminal for indicating the firing stop signal transmitted from the output terminal. The camera also includes an override circuit for inhibiting the charge completion signal from being transmitted to the indicating means in response to a release operation of the camera.

35 Claims, 4 Drawing Figures

INDICATING DEVICE FOR COMPUTER TYPE ELECTRONIC FLASH UNIT

BACKGROUND OF THE INVENTION

This invention relates to an indicating device for an electronic flash unit, and, more particularly, to an indicating device for computer type electronic flash unit (said computer type electronic flash unit is hereinafter abbreviated to electronic flash unit).

It is known to provide a so-called computer type electronic flash unit receptive of the reflected light from an object being photographed by a photoelectric element and responsive to the attainment of the amount of integrated light to a predetermined level for stopping the flash tube from further firing.

With such electronic flash unit, the photographer cannot recognize whether or not the amount of flash light emitted is adequate when in flash photography, because the flash unit automatically controls the flash light value in itself.

On this account, it has been proposed to use a device for indicating the detection of whether or not the electronic flash unit has produced an adequate amount of flash light, in other words, whether or not an amount of flash light necessary to derive a correct flash exposure has been emitted from the discharge tube (said device is hereinafter referred to as "indicating device for electronic flash unit") in Japanese patent application Laid-Open Specification No. Sho 47-17427.

In the indicating device for electronic flash unit according to said proposal, however, because of the necessity of providing for said indication with an additional signal terminal arranged in the electronic flash unit, there are disadvantages such that the complexity of structure of the electronic flash unit is increased, and such that the reliability is largely lowered.

SUMMARY OF THE INVENTION

An object of the present invention is to provide an indicating device for computer type electronic flash unit which overcomes the above-described drawbacks.

Other objects of the present invention will become apparent from the following detailed description thereof.

DESCRIPTION OF THE PREFERRED EMBODIMENTS

The present invention will next be described in connection with embodiments thereof by reference to the drawings.

Figure 1:
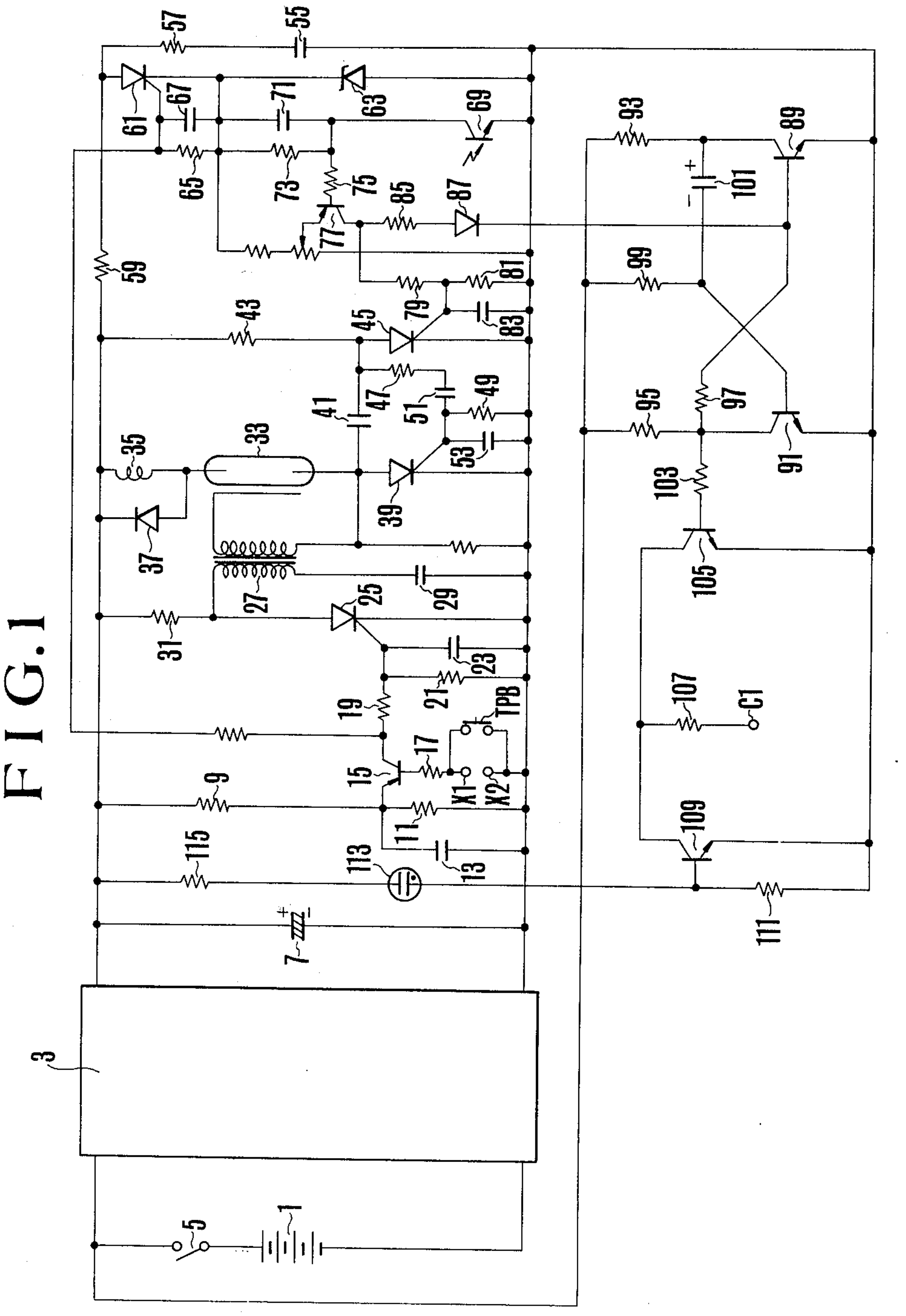
FIG. 1 is an electrical circuit diagram of one embodiment of an electronic flash unit in a camera system according to the present invention.

FIG. 1 shows the circuitry of an electronic flash unit employing one form of the present invention applied to the camera system. Element 1 is an electrical power source or battery; element 3 is a known DC-DC converter connected through a power switch 5 to the above-described battery 1; element 7 is a main capacitor; elements 9, 11 are resistors constituting a voltage dividing circuit; the voltage dividing circuit is connected in parallel to the main capacitor 7. Also connected to the resistor 11 of the voltage dividing circuit is a capacitor 13 in parallel. Element 15 is a pnp transistor connected to the resistor 11 with its base connected to the circuit ground through a resistor 17 and an X-contact provided in the camera body. TPB is a test button; elements 19 and 21 are resistors; element 23 is a capacitor for preventing a thyristor 25 from being accidentally actuated by a noise; element 27 is a trigger transformer connected to the thyristor 25 and a trigger capacitor; element 31 is a resistor forming a charging path to the trigger capacitor 29; element 33 is a discharge tube connected to the main capacitor 7 through a coil 35; element 37 is a diode; element 39 is a main thyristor connected in series to the discharge tube 33; element 41 is a commutation capacitor connected through a charging resistor 43 to the output of the DC-DC converter 3; element 45 is an auxiliary thyristor; elements 47 and 49 are resistors; elements 51 and 53 are capacitors; element 55 is a capacitor connected through resistors 57 and 59 to the output of the DC-DC converter; elements 61 and 63 are a thyristor and a Zener diode forming a series circuit connected in parallel to a series circuit formed from the resistor and the capacitor 55; elements 65 and 67 are a resistor and a capacitor connected in parallel to each other between the gate of the thyristor 61 and the cathode thereof; element 69 is a photo-transistor positioned to receive light from an object being photographed; the phototransistor 69 is connected in series to an integrating capacitor 71. element 73 is a compensation resistor connected in parallel to the capacitor 71; element 75 is a resistor connected to the base of a switching transistor 77; elements 79 and 81 are resistors for transmitting a firing stop signal to a firing stop circuit; element 83 is a capacitor; elements 85 and 87 are a resistor and a diode for conducting the firing stop signal produced from the transistor 77 to a mono-stable multivibrator circuit (hereinafter abbreviated to one-shot) to be described later, the cathode of said diode 87 being connected to the base of a npn transistor 89 forming an input stage of the one-shot. Elements 89 and 91 are npn transistors forming the one-shot known in the art; elements 93, 95, 97 and 99 are resistors also forming the above-described one-shot. It is noted that said one-shot is provided for holding the above-described firing stop signal. Element 101 is a timing capacitor for determining the width of an output pulse of the one-shot together with a resistor 99; Element 105 is a npn transistor connected through a resistor 103 to the output of the one-shot, the collector of said transistor 105 being connected through a resistor 107 to a charge completion signal output terminal C1. Element 109 is a npn transistor with its base connected to a resistor 111 and a neon tube 113. The neon tube 113 is connected through a resistor 115 to the output of the main capacitor 7.

Figure 2:
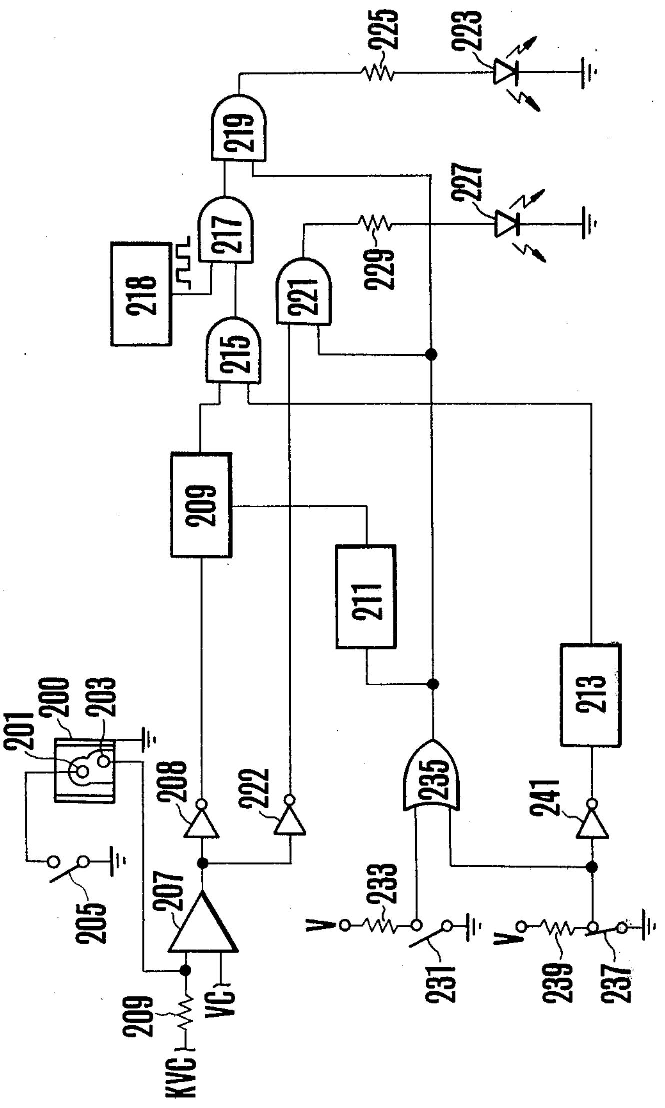
FIG. 2 is an electrical circuit diagram of the main parts of an example of a camera in the above-described camera system.

FIG. 2 shows an example of a camera in the above-described camera system. 200 is a hot shoe fixedly mounted on the camera housing. The shoe is grounded as shown in the figure, and has a signal terminal 203 fixedly mounted in a portion thereof while being electrically insulated from the shoe body. Also provided in a central portion of the shoe 200, is a terminal 201 for the X-contact while being electrically insulated from the shoe body 200 and the signal terminal 203. It is noted that when the above-described electronic flash unit is attached to the camera, the terminal 201 contacts with the terminal X1 shown in FIG. 1, and the terminal 203 contacts with the terminal C1 shown in FIG. 1. Further, the body of the shoe 200 contacts with the terminal X2 shown in FIG. 1, when the above-described electronic flash unit is attached to the camera body.

Element 205 is the above-described X-contact having a fixed point connected to the terminal 201 for the X-contact and a movable contact connected to the circuit ground; element 207 is a comparator having an input terminal connected through a resistor 209 to a battery KVC and a second input terminal connected to another battery VC which produces an output voltage different from that of the battery KVC; the first input of the comparator 207 is further connected to the terminal 203. Element 208 is an inverter; 209 is a latch circuit for holding the output level of the comparator 207 occurring when the output of a one-shot 211 changes from high level (hereinafter called HL) to low level (hereinafter called LL); 215 is an AND gate having inputs connected to the outputs of said latch circuit 209 and a one-shot 213; 217, 219 and 221 are AND gates each having two inputs; 222 is an inverter; 223 is an indicator or light-emitting diode (hereinafter abbreviated to LED) for the electronic flash unit connected to the output of the AND gate 219 through a resistor 225; 227 is a charge completion indicator or LED connected to the output of the AND gate 221 through a resistor 229; 231 is a switch arranged to be closed when the leading curtain of a shutter (not shown) starts to run down and to be opened when a film (not shown) is advanced one frame; the switch 231 has a fixed contact connected through a resistor 233 to a voltage V and one of the inputs of an OR gate 235. Element 237 is a switch arranged to be opened when the trailing curtain reaches the terminal end of running down movement and to be closed when each cycle of film winding up operation is completed; the switch 237 has a fixed contact connected through a resistor 239 to the above-described voltage source V and through an inverter 241 to the input of the above-described one-shot 213.

The operation of the camera system of the above construction will next be described by reference to FIG. 3, where the various portions of the camera system shown in FIGS. 1 and 2 are shown to be coordinated with lines 231, 237 and 205 shown in FIG. 2 respectively, and with lines 235, 211, 213, 111, 91, 209, 221 and 219 representing the output states of the correspondingly numbered parts shown in FIGS. 1 and 2.

The operator will first attach the electronic flash unit of FIG. 1 to the camera of FIG. 2 In this manner, the terminal X1 of FIG. 1 is brought into contact with the terminal 201 of FIG. 2, the terminal X2 of FIG. 1 with the body of the shoe 200, and the charge completion signal output terminal C1 with the terminal 203 of FIG. 2.

Then, when the power switch 5 is closed, charging of the main capacitor 7 starts as is known in the art. When the voltage stored on the capacitor 7 has reached a level at which the discharge tube can be fired, the neon tube 113 is lighted on, causing a voltage of HL to appear across the resistor 111 as shown in FIG. 3, and, therefore, causing the base potential of the transistor 109 to change to HL. Then, a collector current from the voltage source KVC flows through the resistor 107 to the collector of the transistor 109, and the output of the comparator 207 is changed from HL to LL. Such change of the output of the comparator 207 causes one of the inputs of the AND gate 221 to change from LL to HL. On the other hand, at this point in time, the switch 231 remains in the open position as shown in FIG. 2 so that the other input of the AND gate 221 is of HL. Therefore, when the charging of the main capacitor 7 has been completed, the AND gate 221 changes its output from LL to HL, causing the LED 227 to be lighted on to indicate the fact that the main capacitor 7 is fully charged, in other words, the electronic flash unit is ready to fire.

After that, when the camera is released, the leading curtain of the shutter starts to run down, and the switch 231 is closed to change one of the inputs of the OR gate 235 from HL to LL. Since, on the other hand, at this point in time, the trailing curtain of the shutter is latched in the cocked position where the switch 237 is in the closed state, the other input of the OR gate 235 remains at LL. Therefore, the start of running down movement of the leading curtain of the shutter followed by the closure of the switch 231 as shown in FIG. 3 changes the output of the OR gate 235 from HL to LL. Then, the output of the AND gate 221 changes from HL to LL as shown in FIG. 3 In this manner, the full-charge indicator or LED 227 is lighted off thus indicating the fact that the leading curtain of the shutter has run down and an exposure is initiated.

Such change of the output of OR gate 235 from HL to LL also causes the one-shot 211 to be triggered. Its output holds of HL for a predetermined time, t1.

Figure 3:
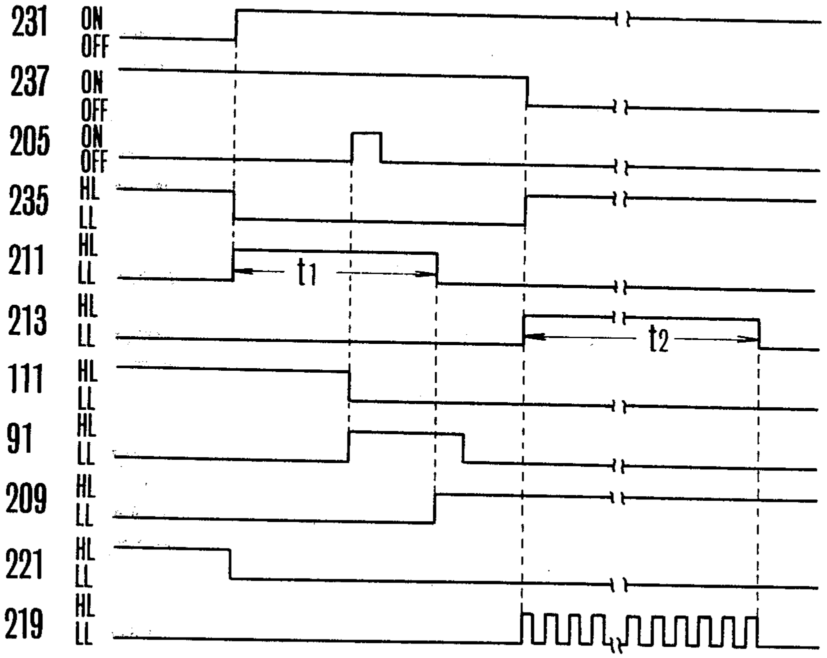
FIG. 3 is a timing chart of the various portions of the above-described camera system.

Then, when the above-described leading curtain has reached the terminal end of the running down movement, the X-contact 205 is closed for a time shown in FIG. 3. In synchronism with the start of closure of the X-contact 205, the transistor 15 of FIG. 1 is turned on, then the thyristor 25 is turned on in a known way, and then the discharge tube 33 is fired to illuminate the object being photographed. Since, on the other hand, such conduction of the thyristor 25 causes conduction of the thyristor 61 also, the charge previously stored on the capacitor 55 is discharged through the resistor 57, thyristor 61 and Zener diode 63, so that a drive voltage of predetermined level depending upon the Zener diode 63 is applied to the firing stop signal generating circuit. Therefore, said the generating circuit starts to operate simultaneously with the start of firing. Then, when the amount of light reflected from the object has reached a predetermined level, as the base potential of the transistor 77 drops to a predetermined value, the transistor 77 is turned on to thereby produce a firing stop signal at the collector thereof. Responsive to this stop signal, the thyristor 45 changes from OFF to ON which, in turn, causes the thyristor 39 to be turned off, thus the discharge tube 33 is stopped from further firing.

Since, on the other hand, the above-described firing stop signal is supplied through the resistor 85 and diode 87 to the base of the transistor 89 of the one-shot and the transistor 89 is turned on, the output of the one-shot of FIG. 1, that is, the collector potential of the transistor 91, takes HL in synchronism with the appearance of the firing stop signal and continues to exist for a predetermined time as shown in FIG. 3. Such change of the collector potential of the transistor 91 to HL also causes a collector current from the voltage source KVC of FIG. 2 to flow through the resistor 209, terminals 203 and C1 and resistor 107 to the collector of the transistor 105. Thus, the firing stop signal is supplied through the charge completion signal output terminal C1 to the comparator 207 in the camera body.

After that, when the output of the one-shot 211 changes from HL to LL, the latch circuit 209 holds the input signal which occurs at this point in time. Since at this time point, the output of the comparator 207 is caused to take LL by the firing stop signal, the latch circuit functions to hold the input signal HL as it occurs at this time point (see FIG. 3). Therefore, one of the inputs of the AND gate 215 is changed to HL at the same time the one-shot 211 is inverted from HL to LL. However, the switch 237 is in the closed position as shown in FIG. 3 at this time point. As a result, since the output of the one-shot 213 is of LL as shown in FIG. 3, the output of the AND gate 215 is left unchanged to HL by this time, and the correct flash exposure indicator or LED 223 is not actuated for lighting yet.

As the exposure goes on, when the trailing curtain of the shutter runs down to the exposure aperture fully closed position, the switch 237 is opened as shown in FIG. 3, thereby the output of inverter 241 is changed from LL to HL. Then, the one-shot 213 is triggered and the output of the one-shot 213 is changed from LL to HL, causing the second input of the AND gate 215 to change to HL. Upon change of the second input of the AND gate 215 to HL by the running down of the trailing curtain, as the first input of the said AND gate 215 is already set in HL by the firing stop signal, the output of AND gate 215 changes to HL in synchronism with the completion of running down of the trailing curtain. Therefore, the AND gates 217 and 219 are turned on and off in synchronism with the output pulses from an oscillator 218 known in the art, or example, at a frequency of 4 Hz. (see FIG. 3 on line 219). Thus, the LED 223 is intermittently lighted on after the exposure is terminated, indicating the fact that an adequate amount of flash light could be obtained.

It is noted that the lighting-on an -off operation of the indicator LED 223 stops in a predetermined time t2, as the output of one-shot 213 changes from HL to LL after the time t2.

The foregoing discussion is valid provided that the given object lies within a range of distances suited for production of the firing stop signal from the firing stop signal generating circuit. If the object lies beyond this range, no firing stop signal is produced. Therefore, this results in LED 223 being left lighted off.

Another embodiment of the present invention will next be described by reference to FIG. 4. Though the FIG. 2 embodiment employs two LED's in indicating the detection of the charge completion signal and the correct flash exposure value derivation, the FIG. 4 embodiment renders it possible to employ only one indicator element in representing the charge completion and the derivation of correct flash exposure value. The other features are almost the same as those in the foregoing embodiment, and, therefore, the following explanation is only directed to the different parts.

Figure 4:
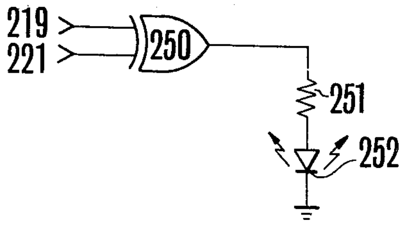
FIG. 4 is a fragmentary circuit diagram showing another embodiment of the present invention.

In FIG. 4, 250 is an exclusive OR gate having one input connected to the output of the AND gate 219 of FIG. 2, and another input connected to the output of the AND gate 221 of FIG. 2. Element 251 is a resistor; and element 252 is an indicator or LED for representing either one of the charge completion and the derivation of correct flash exposure value.

It is noted that in this embodiment, needless to say, the resistors 225, and 229 and the LEDs 223 and 227 must be removed.

In operating the embodiment of FIG. 4, when the main capacitor is fully charged, the LED 252 is lighted on, thus indicating the fact that the flash photography is made ready. When the firing stop signal is produced in a manner similar to that described in connection with the foregoing embodiment, the LED 252 is changed in operating mode to be intermittently lighted on, thus indicating the fact that an adequate amount of flash light was available from the discharge tube 33. In a photographic situation where the object lies beyond the range, though the LED is responsible for the detection of the fully charged condition of the main capacitor 7, there is no possibility of providing a supurious indication that the flash exposure was made with adequate flash illumination.

It will be appreciated from the foregoing that the present invention contemplates the utilization of the charge completion signal output terminal in producing the firing stop signal, in other words, the correct flash-emitted signal. Accordingly, there is no need to use an additional channel for the latter, thereby giving an advantage that the structure is simplified as compared with the conventional system, and the reliability is greatly improved.

What is claimed is:

1. A flash system including a computer type electronic flash unit and a camera, comprising:
- a computer type electronic flash unit including:
  - (a) an output terminal at which a signal representing the fully charged condition of an electrical energy storage capacitor is produced;
  - (b) a firing stop signal generating circuit; and
  - (c) signal supply means for supplying the output of said generating circuit to said output terminal;
- a camera including:
  - (a) indicating means connected to said output terminal for indicating the firing stop signal transmitted from said output terminal; and
  - (b) override means for inhibiting said charge completion signal from being transmitted to said indicating means in response to a releasing operation of said camera.

2. A flash system according to claim 1, wherein said override means is arranged to be triggered in relation to the start of running down of a leading curtain of said camera.

3. A camera for use with a computer type electronic flash unit having an output terminal at which a signal representing the fully charged condition of an electrical energy storage capacitor is produced, a firing stop signal generating circuit, and signal supply means for supplying the output of said generating circuit to said output terminal comprising:
- (a) indicating means connected to said output terminal for indicating the firing stop signal transmitted from said output terminal; and
- (b) override means for inhibiting said charge completion signal from being transmitted to said indicating means in response to a releasing operation of said camera.

4. A camera according to claim 3, wherein said override means is arranged to be triggered in relation to the start of running down of a leading curtain of said camera.

5. A camera according to claim 3, wherein said override means includes a gate circuit for inhibiting said charge completion signal from being transmitted to said indicating means in response to a releasing operation of said camera.

6. A camera according to claim 5, wherein said indicating means includes at least one light emitting diode.

7. A camera according to claim 3, wherein said indicating means includes a first indicating member for indicating the charge completion signal and a second indicating member for indicating the firing stop signal.

8. A camera according to claim 7, wherein said first indicating member consists of a light emitting diode.

9. A camera according to claim 7, wherein said second indicating member consists of a light emitting diode.

10. A flash system including a computer type electronic flash unit and a camera, comprising:

a computer type electronic flash unit including:

(a) a signal output terminal;

(b) first signal supply means for supplying a first signal representing the fully charged condition of an electrical energy storage capacitor to said output signal terminal; and (c) second signal supply means for supplying a second signal to said signal output terminal when a predetermined quantity of light has been emitted from the flash unit;

a camera including:

(a) indicating means;

(b) a first signal path connected to the signal output terminal of said flash unit for transmitting the first signal to said indicating means;

(c) override means connected to the first signal path for inhibiting said first signal from being transmitted to said indicating means in response to a releasing operation of said camera; and (d) a second signal path connected to the signal output terminal of said flash unit for transmitting the second signal to said indicating means.

11. A flash system according to claim 10, wherein said override means consists of a first gate which is provided through the first signal path.

12. A flash system according to claim 10, wherein said second signal path includes a second gate for periodically transmitting the second signal to said indicating means.

13. A flash system according to claim 12, further comprising periodical signal generating means connected to the second gate for periodically energizing the second gate.

14. A flash system according to claim 13, wherein said second gate consists of an AND gate.

15. A flash system according to claim 10, wherein said indicating means includes at least one light emitting diode responsive to the first signal from the first signal path and the second signal from the second signal path.

16. A camera for use with a computer type electronic flash unit having a signal output terminal, first signal supply means for supplying a first signal representing the fully charged condition of an electrical energy storage capacitor to said signal output terminal, and second signal supply means for supplying a second signal to said signal output terminal when a predetermined quantity of light has been emitted from the flash unit, comprising:

(a) indicating means;

(b) a first signal path connected to the signal output terminal of said flash unit for transmitting the first signal to said indicating means;

(c) override means connected to the first signal path for inhibiting said first signal from being transmitted to said indicating means in response to a releasing operation of said camera; and (d) a second signal path connected to the signal output terminal of said flash unit for transmitting the second signal to said indicating means.

17. A camera according to claim 16, wherein said override means consists of a first gate which is provided through the first signal path.

18. A camera according to claim 16, wherein said second signal path includes a second gate for periodically transmitting the second signal to said indicating means.

19. A camera according to claim 18, further comprising periodical signal generating means connected to the second gate for periodically energizing the second gate.

20. A camera according to claim 19, wherein said second gate consists of an AND gate.

21. A camera according to claim 16, wherein said indicating means includes at least one light emitting diode responsive to the first signal from the first signal path and the second signal from the second signal path.

22. A computer type electronic flash unit for use with a camera having indicating means, a first signal path for transmitting a first signal to said indicating means, override means connected to the first signal path for inhibiting said first signal from being transmitted to said indicating means in response to a releasing operation of said camera, and a second signal path for transmitting a second signal to said indicating means, comprising:

(a) a signal output terminal connected to both of said first and second signal paths;

(b) first signal supply means for supplying the first signal representing the fully charged condition of an electrical energy storage capacitor to said signal output terminal; and (c) second signal supply means for supplying the second signal to said signal output terminal when a predetermined quantity of light has been emitted from the flash unit.

23. A flash system including a computer type electronic flash unit and a camera, comprising:

a computer type electronic flash unit including:

(a) a signal output terminal;

(b) first signal supply means for supplying a first signal representing the fully charged condition of an electrical energy storage capacitor to said signal output terminal; and (c) second signal supply means for supplying a second signal for an interval to said signal output terminal when a predetermined quantity of light has been emitted from the flash unit;

a camera including:

(a) indicating means;

(b) a first signal path connected to the signal output terminal of said flash unit for transmitting the first signal to said indicating means; and (c) a second signal path connected to the signal output terminal of said flash unit for transmitting the second signal to said indicating means, said second signal path including a latch circuit which latches the second signal before the second signal has disappeared.

24. A flash system according to claim 23, wherein said indicating means includes a first light emitting member connected to the first signal path and a second light emitting member connected to the second signal path.

25. A flash system according to claim 23, wherein said second signal path further includes signal changing means for changing the second signal from the latch circuit into a periodical signal to be transmitted to the indicating means.

26. A flash system according to claim 25, wherein said signal changing means includes a gate connected between the latch circuit and the indicating means and a periodical signal generating connected to the gate for energizing the gate periodically.

27. A camera for use with a computer type electronic flash unit having a signal output terminal, first signal supply means for supplying a first signal representing the fully charged condition of an electrical energy storage capacitor to said signal output terminal, and second signal supply means for supplying a second signal for an interval to said signal output terminal when a predetermined quantity of light has been emitted from the flash unit, comprising:

(a) indicating means;

(b) a first signal path connected to the signal output terminal of said flash unit for transmitting the first signal to said indicating means; and (c) a second signal path connected to the signal output terminal of said flash unit for transmitting the second signal to said indicating means, said second signal path including a latch circuit which latches the second signal before the second signal has disappeared.

28. A flash system according to claim 27, wherein said indicating means includes a first light emitting member connected to the first signal path and a second light emitting member connected to the second signal path.

29. A flash system according to claim 27, wherein said second signal path further includes signal changing means for changing the second signal from the latch circuit into a periodical signal to be transmitted to the indicating means.

30. A flash system according to claim 29, wherein said signal changing means includes a gate connected between the latch circuit and the indicating means and a periodical signal generating connected to the gate for energizing the gate periodically.

31. A computer type electronic flash unit for use with a camera having indicating means, a first signal path for transmitting a first signal to said indicating means, and a second signal path for transmitting a second signal to said indicating means and having a latch circuit which latches the second signal before the second signal has disappeared, comprising:

(a) a signal output terminal connected to said first and second signal paths;

(b) first signal supply means for supplying the first signal representing the fully charged condition of an electrical energy storage capacitor to said signal output terminal; and (c) second signal supply means for supplying the second signal for an interval to said signal output terminal when a predetermined quantity of light has been emitted from the flash unit.

32. A flash system including a computer type electronic flash unit and a camera, comprising:

a computer type electronic flash unit including:

(a) a signal output terminal;

(b) first signal supply means for supplying a first signal representing the fully charged condition of an electrical energy storage capacitor to said signal output terminal; and (c) second signal supply means for supplying a second signal for an interval to said signal output terminal when a predetermined quantity of light has been emitted from the flash unit;

a camera including:

(a) indicating means;

(b) a first signal path connected to the signal output terminal of said flash unit for transmitting the first signal to said indicating means; and (c) a second signal path connected to the signal output terminal of said flash unit for transmitting the second signal to said indicating means, said second signal path including a latch circuit which latches the second signal before the second signal has disappeared and means for energizing said indicating means after the second signal has disappeared.

33. A flash system according to claim 32, wherein said energizing means includes a gate circuit connected between the latch circuit and the indicating means.

34. A flash system having a computer type electronic flash unit and a camera, comprising:

a computer type electronic flash unit including:

(a) first signal generating means for generating a first signal when a predetermined quantity of light has been emitted from the flash unit; and a camera including:

(a) indicating means for indicating the first signal; and (b) means connected to said indicating means for effecting an indication in the indicating means in connection with the termination of the exposure in said camera.

35. A flash system according to claim 34, wherein said effecting means includes a gate connected to said indicating means for energizing the indicating means when a trailing curtain has reached the terminal end of running down movement.

* * * * *